United States Patent
Rangan

(10) Patent No.: US 11,720,900 B1
(45) Date of Patent: *Aug. 8, 2023

(54) SYSTEMS AND METHODS FOR ADAPTIVE LEARNING TO REPLICATE PEAK PERFORMANCE OF HUMAN DECISION MAKING

(71) Applicant: UNITED SERVICES AUTOMOBILE ASSOCIATION (USAA), San Antonio, TX (US)

(72) Inventor: Gopinath Rangan, Milpitas, CA (US)

(73) Assignee: United Services Automobile Association (USAA), San Antonio, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/172,935

(22) Filed: Feb. 10, 2021

Related U.S. Application Data

(63) Continuation of application No. 15/353,760, filed on Nov. 17, 2016, now Pat. No. 10,949,856.
(Continued)

(51) Int. Cl.
*G06Q 20/00* (2012.01)
*G06Q 20/40* (2012.01)
(Continued)

(52) U.S. Cl.
CPC ......... *G06Q 20/405* (2013.01); *G06F 3/0481* (2013.01); *G06Q 20/065* (2013.01);
(Continued)

(58) Field of Classification Search
CPC .................................................. G06Q 20/00
See application file for complete search history.

(56) References Cited

U.S. PATENT DOCUMENTS 9,185,095 B1 * 11/2015 Moritz ................ H04L 63/0861
9,396,486 B2 * 7/2016 Stivoric ............... A61B 5/7275
(Continued)

FOREIGN PATENT DOCUMENTS

| AU | 2016101183 A4 | 9/2016 |
| CN | 105681301 A | 6/2016 |

(Continued)

OTHER PUBLICATIONS

The EARN-Health Trial: protocol for a randomised controlled trial to identify health effects of a financial savings programme among low-income US adults Sanjay Basu, Rita Hamad, Justin S White, Sepideh Modrek, David H Rehkopf, and Mark R Cullen (Year: 2015).*

(Continued)

*Primary Examiner* — Bruce I Ebersman
*Assistant Examiner* — John A Anderson
(74) *Attorney, Agent, or Firm* — Fletcher Yoder, P.C.

(57) ABSTRACT

The application is directed to a computer-implemented apparatus for facilitating transactions. The apparatus includes a non-transitory memory having instructions stored thereon for performing an evaluation of user performance prior to proceeding with a transaction. The apparatus also includes a processor, operably coupled to the non-transitory memory. The processor is configured to perform the instructions of displaying, on a graphical user interface (GUI), an input box requesting a user to input information associated with the transaction. The processor is also configured to receive, via the GUI, information from the user associated with the transaction. The processor is also configured to perform the instruction of evaluating the received information associated with the transaction based upon decision criteria.

18 Claims, 8 Drawing Sheets

Related U.S. Application Data

(60) Provisional application No. 62/256,314, filed on Nov. 17, 2015.

(51) Int. Cl.

| | | |
|---|---|---|
| *H04L 9/32* | (2006.01) | |
| *G06F 3/0481* | (2022.01) | |
| *G06Q 20/06* | (2012.01) | |
| *H04L 9/14* | (2006.01) | |
| *H04L 9/30* | (2006.01) | |
| *H04L 9/06* | (2006.01) | |

(52) U.S. Cl.
CPC .............. *H04L 9/0637* (2013.01); *H04L 9/14* (2013.01); *H04L 9/30* (2013.01); *H04L 9/32* (2013.01); *H04L 2209/56* (2013.01)

(56) References Cited

U.S. PATENT DOCUMENTS

| | | | |
|---|---|---|---|
| 9,830,660 B2 * | 11/2017 | Dintenfass | G06Q 40/06 |
| 10,062,011 B2 | 8/2018 | Cox et al. | |
| 10,091,180 B1 | 10/2018 | Moritz et al. | |
| 2014/0156308 A1 * | 6/2014 | Ohnemus | G16H 40/67 |
| | | | 705/3 |
| 2014/0365354 A1 * | 12/2014 | Shvarts | G06Q 40/02 |
| | | | 705/38 |
| 2015/0332395 A1 | 11/2015 | Walker et al. | |
| 2015/0363770 A1 * | 12/2015 | Ronca | G06Q 20/382 |
| | | | 705/64 |
| 2015/0363777 A1 | 12/2015 | Ronca et al. | |
| 2015/0363778 A1 | 12/2015 | Ronca et al. | |
| 2015/0363782 A1 | 12/2015 | Ronca et al. | |
| 2015/0363783 A1 | 12/2015 | Ronca et al. | |
| 2015/0379510 A1 | 12/2015 | Smith | |
| 2016/0203477 A1 | 7/2016 | Yang et al. | |
| 2016/0224977 A1 | 8/2016 | Sabba et al. | |
| 2016/0234026 A1 | 8/2016 | Wilkins et al. | |
| 2016/0253663 A1 | 9/2016 | Clark et al. | |
| 2016/0260169 A1 | 9/2016 | Arnold et al. | |
| 2016/0321751 A1 | 11/2016 | Creighton, IV et al. | |
| 2016/0321752 A1 | 11/2016 | Tabacco et al. | |
| 2016/0328713 A1 | 11/2016 | Ebrahimi | |
| 2016/0342978 A1 | 11/2016 | Davis et al. | |
| 2016/0342989 A1 | 11/2016 | Davis | |
| 2017/0053249 A1 * | 2/2017 | Tunnell | G09C 5/00 |
| 2017/0076280 A1 | 3/2017 | Castinado et al. | |
| 2017/0076286 A1 | 3/2017 | Castinado et al. | |
| 2017/0078299 A1 | 3/2017 | Castinado et al. | |
| 2017/0091397 A1 | 3/2017 | Shah | |
| 2017/0103391 A1 | 4/2017 | Wilson, Jr. et al. | |
| 2017/0109748 A1 | 4/2017 | Kote | |
| 2017/0132625 A1 | 5/2017 | Kennedy | |
| 2017/0132626 A1 | 5/2017 | Kennedy | |
| 2017/0132630 A1 | 5/2017 | Castinado et al. | |
| 2017/0140145 A1 | 5/2017 | Shah | |
| 2017/0140375 A1 | 5/2017 | Kunstel | |
| 2017/0178237 A1 | 6/2017 | Wong | |
| 2017/0228704 A1 | 8/2017 | Zhou et al. | |
| 2017/0230353 A1 | 8/2017 | Kurian et al. | |
| 2017/0230375 A1 | 8/2017 | Kurian | |
| 2017/0236121 A1 | 8/2017 | Lyons et al. | |
| 2017/0243025 A1 | 8/2017 | Kurian et al. | |
| 2017/0243177 A1 | 8/2017 | Johnsrud et al. | |
| 2017/0243208 A1 | 8/2017 | Kurian et al. | |
| 2017/0243209 A1 | 8/2017 | Johnsrud et al. | |
| 2017/0243212 A1 | 8/2017 | Castinado et al. | |
| 2017/0243286 A1 | 8/2017 | Castinado et al. | |
| 2017/0244707 A1 | 8/2017 | Johnsrud et al. | |
| 2017/0244757 A1 | 8/2017 | Castinado et al. | |
| 2017/0270527 A1 | 9/2017 | Rampton | |
| 2017/0286951 A1 | 10/2017 | Ignatchenko et al. | |
| 2017/0287068 A1 * | 10/2017 | Nugent | G06Q 20/08 |

FOREIGN PATENT DOCUMENTS

| | | |
|---|---|---|
| CN | 106204287 A | 12/2016 |
| CN | 106408299 A | 2/2017 |
| CN | 106506493 A | 3/2017 |
| CN | 106600401 A | 4/2017 |
| CN | 106611372 A | 5/2017 |
| CN | 106682528 A | 5/2017 |
| KR | 20160150278 A | 12/2016 |
| KR | 101701131 B1 | 2/2017 |
| KR | 20170040079 A | 4/2017 |
| KR | 101762245 B1 | 7/2017 |
| WO | 2016175914 A2 | 11/2016 |
| WO | 2017022917 A1 | 2/2017 |
| WO | 2017027900 A1 | 2/2017 |
| WO | 2017066002 A1 | 4/2017 |
| WO | 2017091530 A1 | 6/2017 |
| WO | 2017136956 A1 | 8/2017 |
| WO | 2017139688 A1 | 8/2017 |
| WO | 2017146333 A1 | 8/2017 |

OTHER PUBLICATIONS

Care Models of eHealth Services: A Case Study on the Design of a Business Model for an Online Precare Service Publishing Venue: JMIR Research Protocols, 4(1), e32 Authors: van Meeuwen, Dorine PD • van Walt Meijer, Quirine J • Simonse, Lianne WL (Year: 2015).*

Hover-over content for user interfaces Publishing Venue: The IP.com Prior Art Database (Year: 2014).*

The EARN-Health Trial: procotol for a randomised controlled trial to identify health effects of financial savings programme amoung low income adults. Author: Sanjay Basu et al. (Year: 2015).*

Wikipedia.com' [online]. "Proof-of-stake," Nov. 2016, [retrieved on Dec. 2, 2016]. Retrieved from the Internet: URL<https://en.wikipedia.org/wiki/Proof-of-stake>. 4 pages.

Wikipedia.com' [online] "Blockchain (database)," Dec. 2016, [retrieved on Dec. 2, 2016] Retrieved from the Internet: URL<https://en.wikipedia.org/wiki/Blockchain_(database)>. 12 pages.

Huang et al., "Discovering association rules from responded questionnaire for diagnosing geriatric depression," Jul. 2012, IEEE Xplore, Kobe, Japan, pp. 343-348.

* cited by examiner

500

DISPLAYING, ON A GUI, AN INPUT BOX REQUESTING A USER TO INPUT INFORMATION ASSOCIATED WITH THE TRANSACTION
510

RECEIVING, VIA THE GUI OVER A NETWORK, THE INFORMATION FROM THE USER ASSOCIATED WITH THE TRANSACTION
520

EVALUATING THE RECEIVED INFORMATION ASSOCIATED WITH THE TRANSACTION BASED ON DECISION CRITERIA INCLUDING WHETHER THE TRANSACTION EXCEEDS A PREDETERMINED FINANCIAL THRESHOLD
530

SENDING, VIA THE GUI, AN APPROVAL TO THE USER AFTER THE EVALUATION
540

FIG. 5

SYSTEMS AND METHODS FOR ADAPTIVE LEARNING TO REPLICATE PEAK PERFORMANCE OF HUMAN DECISION MAKING

CROSS-REFERENCE TO RELATED APPLICATIONS

This application is a continuation of U.S. patent application Ser. No. 15/353,760, entitled "Systems and Methods for Adaptive Learning to Replicate Peak Performance of Human Decision Making," filed Nov. 17, 2016, which claims the benefit of U.S. Provisional Patent Application Ser. No. 62/256,314, which was filed on Nov. 17, 2015, each of which is incorporated herein by reference in its entirety.

BACKGROUND

More than 50 million Americans suffer from some form of mental health disorder. Mental health disorders affect an individual's mood, thinking and behavior. Mental health is classified as a disorder when ongoing signs and symptoms result in frequent stress and the ability to function.

The causes of mental health disorders are generally based upon genetic and environmental factors. For example, genetic factors include inherited traits from relatives. Environmental factors may include exposures prior to birth, e.g., while in the womb, from viruses, toxins, alcohols or drugs. Further, brain chemistry based upon biochemical changes can affect mood and other aspect of mental health.

Poor decisions are typically made by individuals suffering from diminished mental health capacity. While unintended, these poor decisions can result in significant financial hardships affecting individuals and their loved ones.

What is desired is a system and method to reduce and/or eliminate the likelihood of individuals with mental health disorders making poor financial decisions.

SUMMARY

This summary is provided to introduce a selection of concepts in a simplified form that are explained in more depth in the detailed description below. This summary is not intended to limit the scope of the claimed subject matter. The foregoing needs are met, to a great extent, by the present application directed to methods and systems for facilitating transactions based upon the current mental health of an individual.

In a first aspect of the application, a computer-implemented apparatus for facilitating transactions is described. The apparatus includes a non-transitory memory having instructions stored thereon for performing an evaluation of user performance prior to proceeding with a transaction. The apparatus also includes a processor, operably coupled to the non-transitory memory. The processor is configured to perform the instructions of displaying, on a graphical user interface (GUI), an input box requesting a user to input information associated with the transaction. The processor is also configured to receive, via the GUI, information from the user associated with the transaction. The processor is also configured to perform the instruction of evaluating the received information associated with the transaction based upon decision criteria.

In a second aspect of the application, a computer-implemented method for facilitating transactions is described. The method includes a step of displaying, on a GUI, an input box requesting a user to input information associated with the transaction. The method also includes a step of receiving, via a GUI over a network, the information from the user associated with the transaction. The method further includes a step of evaluating the received information associated with the transaction based on decision criteria including whether the transaction exceeds a predetermined financial threshold. The method even further includes a step of sending, via the graphical user interface, an approval to the user after the evaluation.

BRIEF DESCRIPTION OF DRAWINGS

The above-mentioned features and aspects of the present disclosure will become more apparent with reference to the following description taken in conjunction with the accompanying drawings where like reference numerals denote like elements and in which:

FIG. 5 illustrates an exemplary method according to an aspect of the application.

DETAILED DESCRIPTION

Figure 1A:
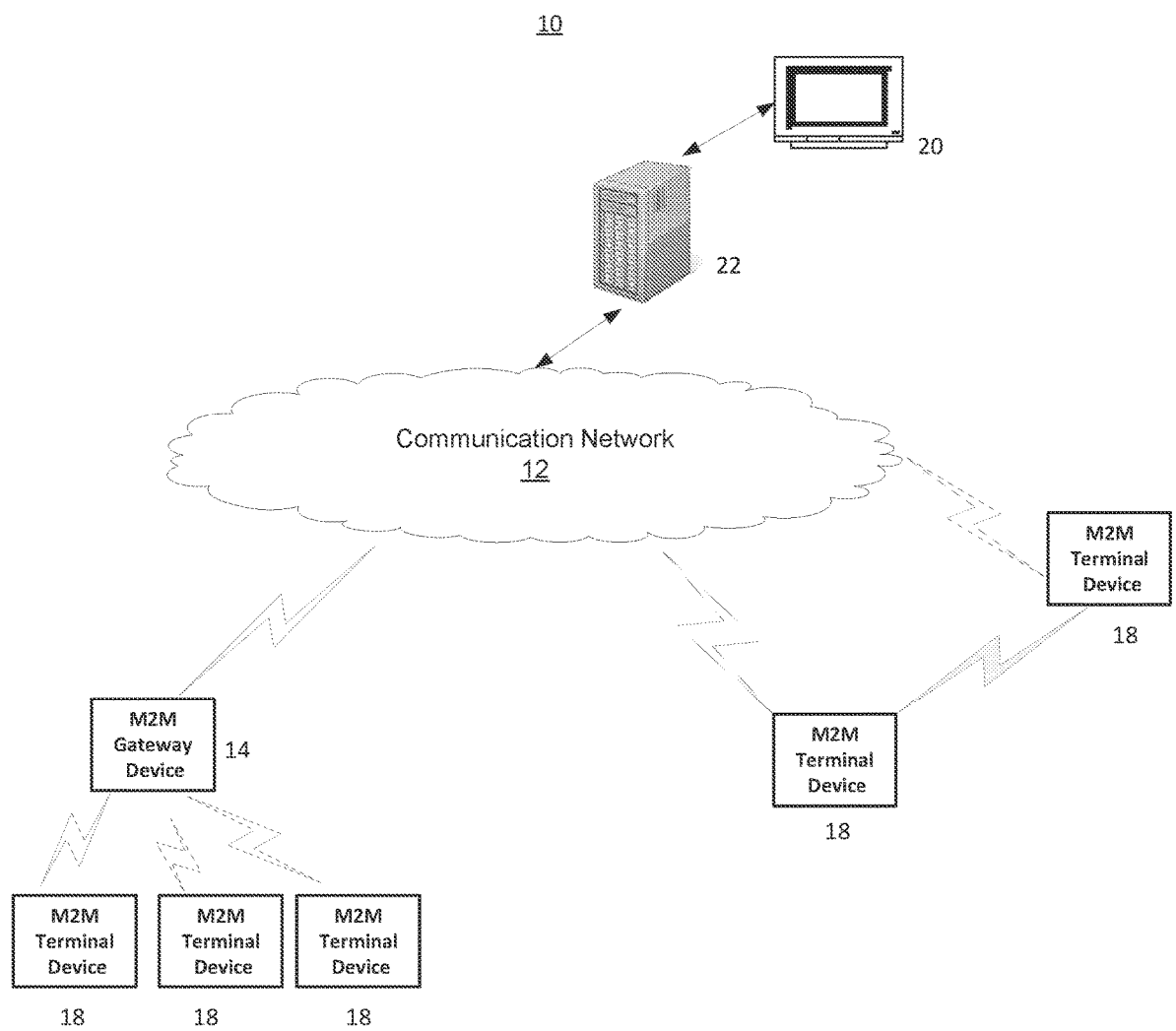
FIG. 1A illustrates a communication system.

A detailed description of the illustrative embodiments will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments.

Accordingly, the invention is not to be limited by what has been particularly shown and described, except as indicated by the appended claims. Further, although at least one series of steps are presented as an exemplary method of practicing one or more embodiments described herein, it will be appreciated by those skilled in the art that the steps identified may be practiced in any order that is practicable, including, without limitation, the omission of one or more steps.

The present application is directed to systems and methods for facilitating transactions based upon an evaluation of an individual's mental state. Prior to explaining the above-mentioned features in more detail, an introductory explanation of the concepts of bitcoin or any other cryptocurrency and block chain will be discussed. Thereafter, general architecture employed in the application will be discussed in detail.

Bitcoin

Bitcoin is a unit of currency of a peer-to-peer system that is not regulated by any central or governmental authority. Rather, the regulation of bitcoins (i.e., the issuance of new bitcoins and the tracking of transactions involving bitcoins) may be accomplished collectively by the network of people and businesses that conduct business with bitcoins.

While bitcoins are currently created by solving proof-of-work problems, the bitcoin network is programmed to gradually approach a maximum number of 21,000,000 available bitcoins. Specifically, the bitcoin supply is programmed to grow as a geometric series approximately every 4 years such that by 2013 half of the total available supply of bitcoins will be generated, and by 2017, 75% of the total available supply of bitcoins will be generated. Accordingly, to provide liquidity in the bitcoin supply, bitcoins are divisible to eight decimal places (i.e., to facilitate the use of fractional bitcoins).

Once generated or mined, a bitcoin may be stored in a person's bitcoin "wallet" which may be either stored on the person's computer by the bitcoin software or hosted on a third-party website. The wallet may show users their available bitcoin balance, any transaction history, and the collection of bitcoin addresses they may use to send and receive bitcoins with other users. If an owner of a bitcoin decides to: (i) exchange a quantity of bitcoins for another form of currency, such as for U.S. dollars, and/or used (ii) use a quantity of bitcoins as a form of payment for goods or services, the owner of a bitcoin transfers the bitcoin to a payee by digitally signing a hash of the previous transaction (involving the bitcoin or any other cryptocurrency) and a public key of the payee and then adding these to the end of the bitcoin address. With such information viewable in the bitcoin address, the payee can verify the chain of ownership. For example, when a bitcoin belonging to user A is transferred to user B, user A's ownership over that bitcoin is relinquished by adding user B's public key address to the bitcoin coin and signing the result with the private key that is associated with user A's address. User B now owns the bitcoin and can transfer it further. In this example, user A is prevented from transferring the already spent bitcoin to other users because a public list of all previous transactions may be collectively maintained by the network.

Compared to existing types of available currency, bitcoins appear to have an increased level of anonymity. That is, while a person who has deposited an amount of an available currency, such as an amount of U.S. dollars, at a bank may be required to provide their identification to withdraw their deposited funds and/or transfer their deposited funds to another person, bitcoins are anonymous and do not require any identification (other than a randomly generated key address) of the people currently owning such bitcoins. Additionally, compared to existing types of available currency which rely on a central authority, such as a bank, to accurately maintain records regarding an amount of currency a person has deposited and to make an amount of deposited currency available to a person upon a person's request, bitcoins do not rely on any central authority to maintain any account balances.

General Architecture

FIG. 1A is a diagram of an example machine-to machine (M2M), Internet of Things (IoT), or Web of Things (WoT) communication system 10 in which one or more disclosed embodiments may be implemented. As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below M2M devices 18 and gateways 14 may communicate via various networks including, cellular, WLAN, WPAN, e.g., Zigbee, 6LoWPAN, Bluetooth, direct radio link, and wireline for example.

Figure 1B:
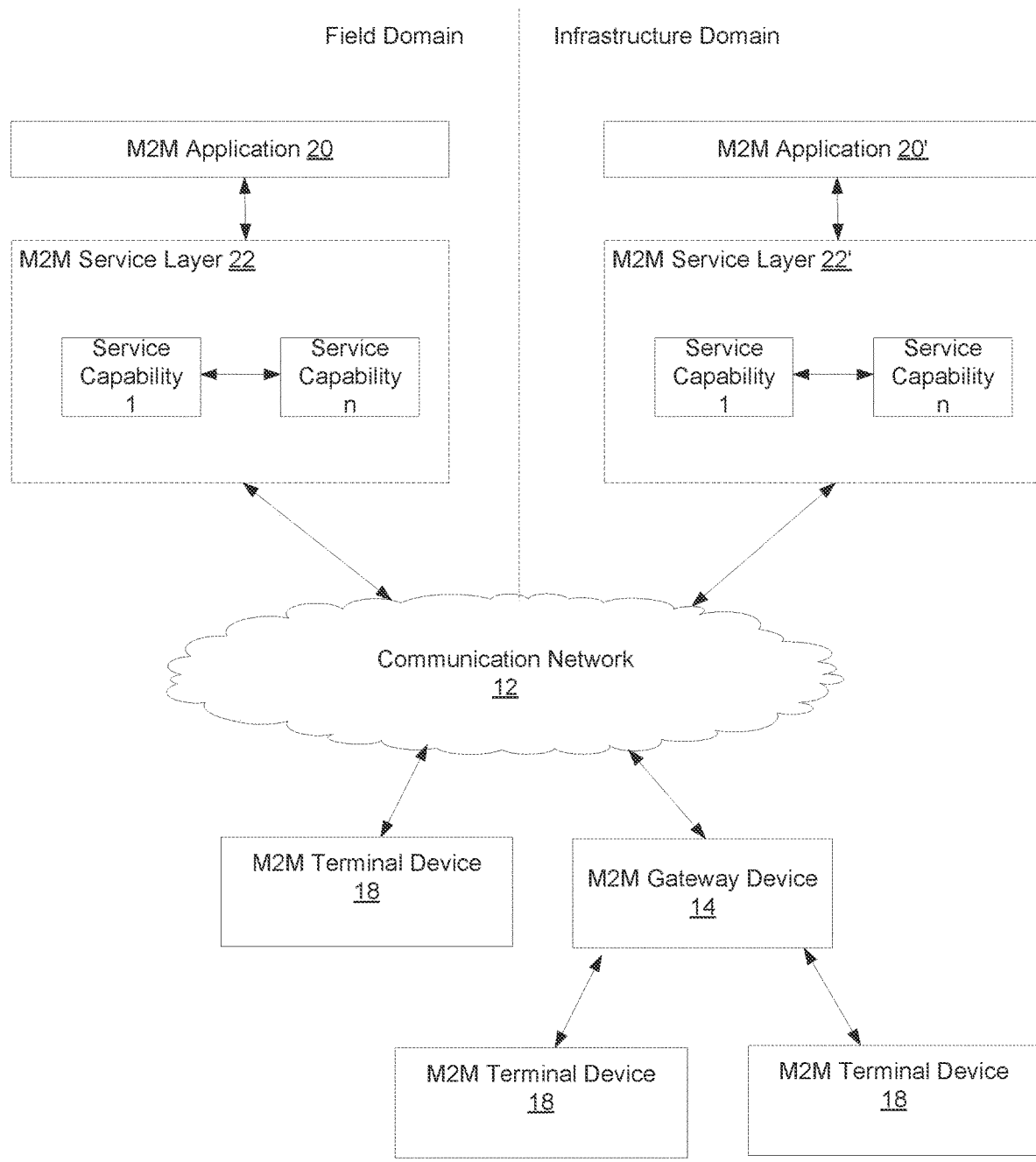
FIG. 1B illustrates a service platform.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like.

The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, real estate, financials, transportation, health and wellness, connected home, energy management, asset Tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as LLN devices, routers and PCEs as discussed in this application and illustrated in the figures.

The methods discussed in the present application may be implemented as part of a service layer. The service layer is a software middleware layer that supports value-added service capabilities through a set of Application Programming Interfaces (APIs) and underlying networking interfaces. Both ETSI M2M and one M2M use a service layer that may contain this method of reserving a Track. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node.

Figure 1C:
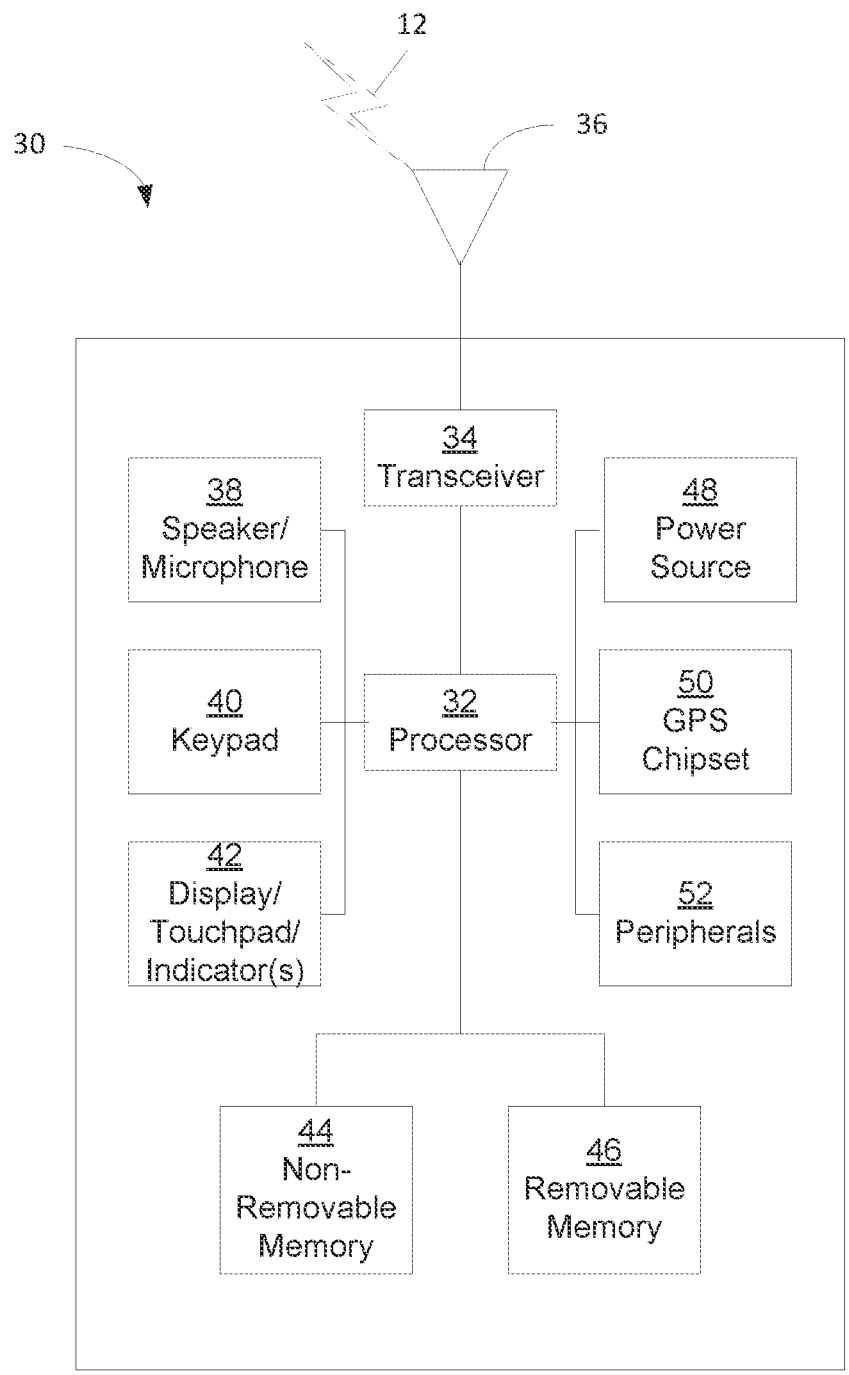
FIG. 1C illustrates a system diagram of a computer-implemented device.

FIG. 1C is a system diagram of an example M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including fore example LLN devices, Backbone routers and PCEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
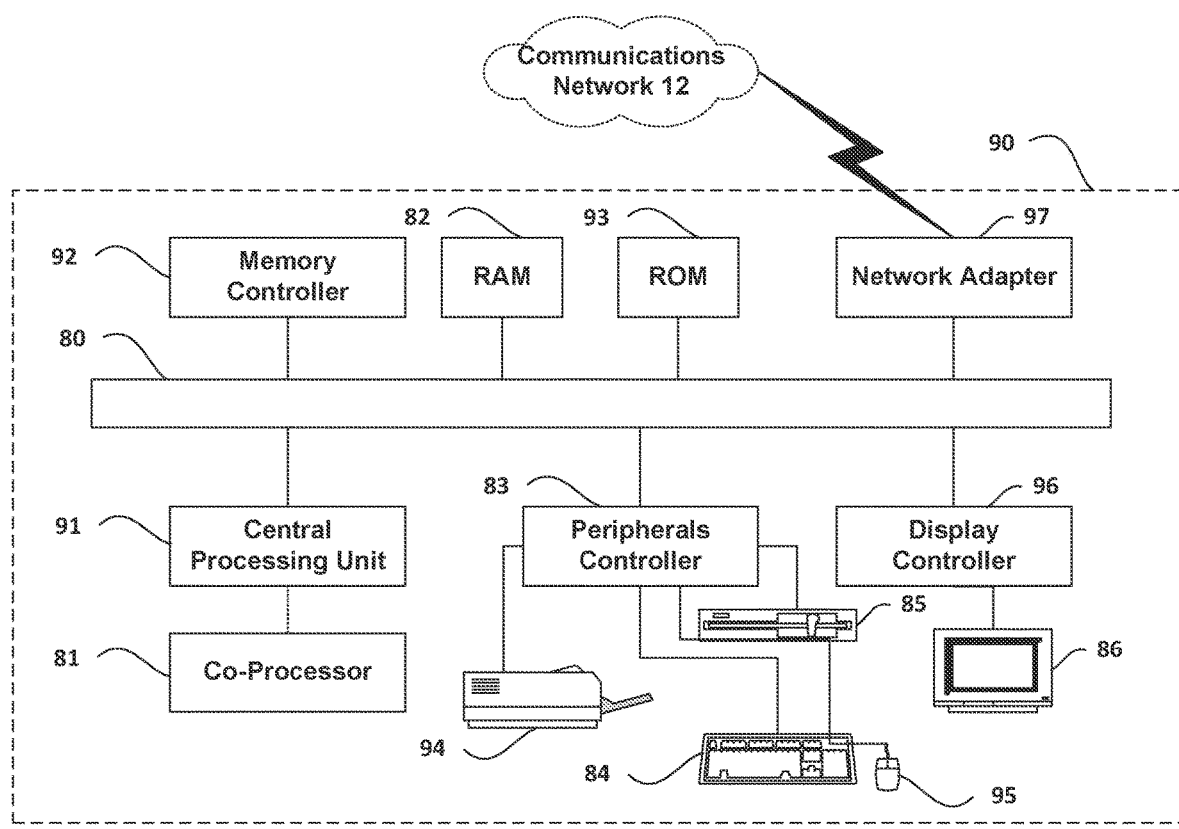
FIG. 1D illustrates a block diagram of an exemplary computing system.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Evaluating Peak Performance

In an aspect of the application, a processor executes instructions for evaluating an individual's mental health state condition. In so doing, the peak performance of the individual can be evaluated prior to dispensing funds to them. This will ultimately reduce and/or eliminate the occurrence of poor financial decisions incurred by individuals suffering from a mental health disorder. If the peak performance meets the threshold of predetermined criteria, the adaptive learning program may approve funds requested by an individual. Generally, the funds may be located in a custodial account or in the individual's own bank account with security features. Moreover, the account may be associated with a mobile wallet for transacting bitcoins.

Figure 2:
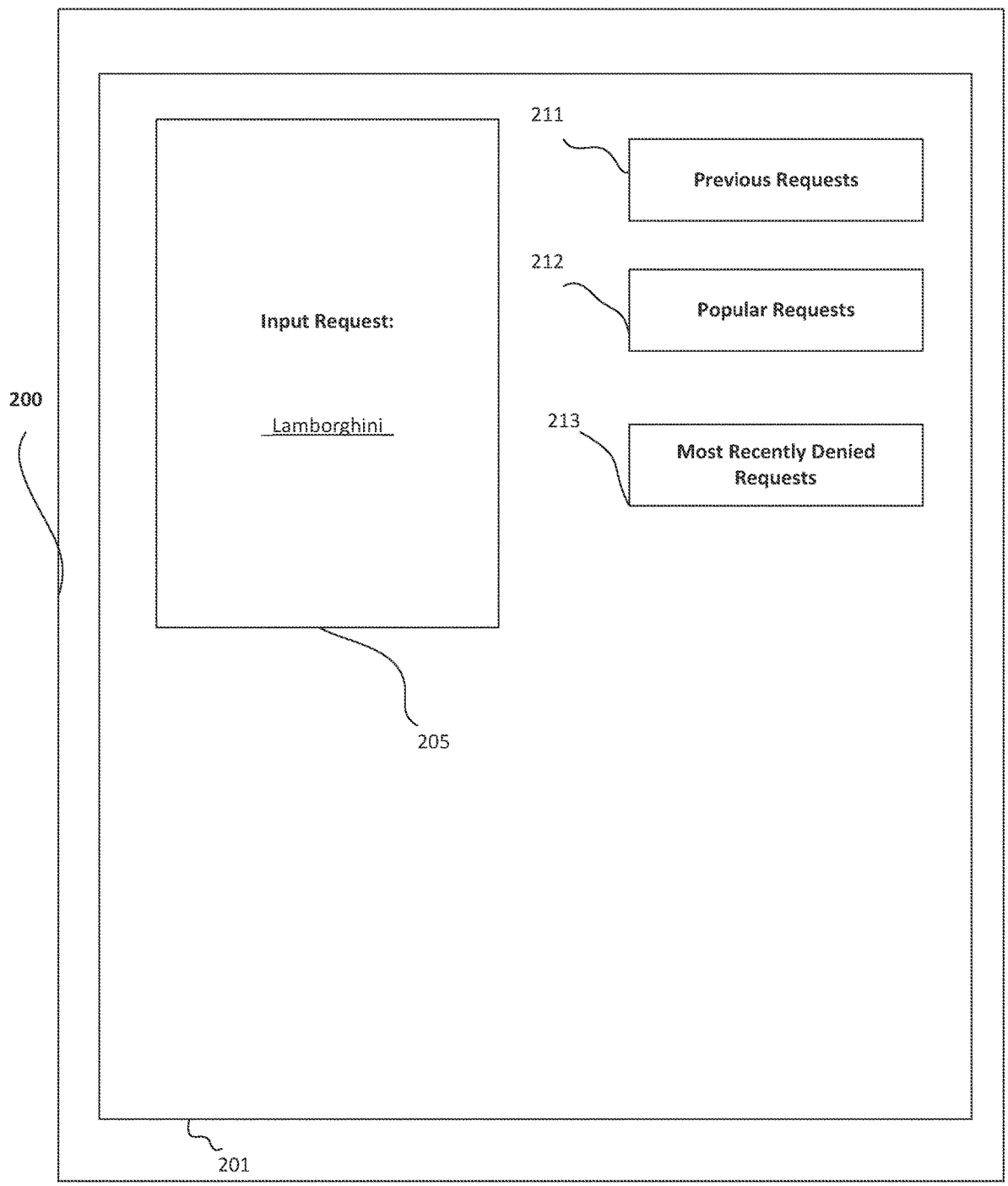
FIG. 2 illustrates a graphical user interface showing inputs for a user desiring to proceed with a transaction according to an aspect of the application.

In an embodiment of the application, the individual seeking funds opens an application on a user device such as described above in FIGS. 1A-1D. The device may include but is not limited to a desktop computers, laptops, tablets and smartphones. In some embodiments, the device may include a kiosk, such as for example, an ATM machine. A graphical user interface (GUI) 200 shows the adaptive learning application 201 as depicted in FIG. 2. The application 201 may be accessed by computers over a network as described above with respect to FIG. 1A. In order to begin a transaction, the individual, e.g., requestor, inputs a request into the input box 205 provided in the application 201. As shown in FIG. 2, the individual has input a request for purchasing a Lamborghini.

The application 201 may also include a selection box 211 which includes one or more previous requests from the user. For example, if the user had already requested a Lamborghini, this request would populate in a drop down from box 211.

The application 201 may also include a selection box 212 which includes the most popular requests for people on the network. The network may include all individuals who are using the application 201. Hence, the data may be pulled from tens of millions of individuals.

The application 201 may also include a selection box 213 for screening requests most recently denied by the application. Selection box 231 may help the requestor understand the likelihood of whether their request will be denied. This allows the user to make an intelligent request. In an embodiment of the application, the denied requests 213, popular requests 212 and previous requests 211 may each have a hyperlink to the terms of the request where applicable. For example, if the request from a user was for a Lamborghini, the terms of the contract would be made available for review. The terms may be uploaded for review by the application by any known techniques in the field, e.g., attachment via e-mail, the cloud, etc. In another example, if the request was for a home, the terms of the agreement may be made available for viewing and subsequent evaluation by the application.

According to another embodiment, smart contracts may be employed for the transactions between the user/buyer and a merchant. The smart contracts may be reviewed by the application 201. Generally, smart contracts are computer protocols that facilitate, verify, or enforce the negotiation or performance of a contract, or that obviate the need for a contractual clause. Smart contracts have a user interface and emulate the logic of contractual clauses. Smart contracts provide better security to traditional contracts. Smart contracts also reduce transaction costs associated with contracting.

Figure 3:
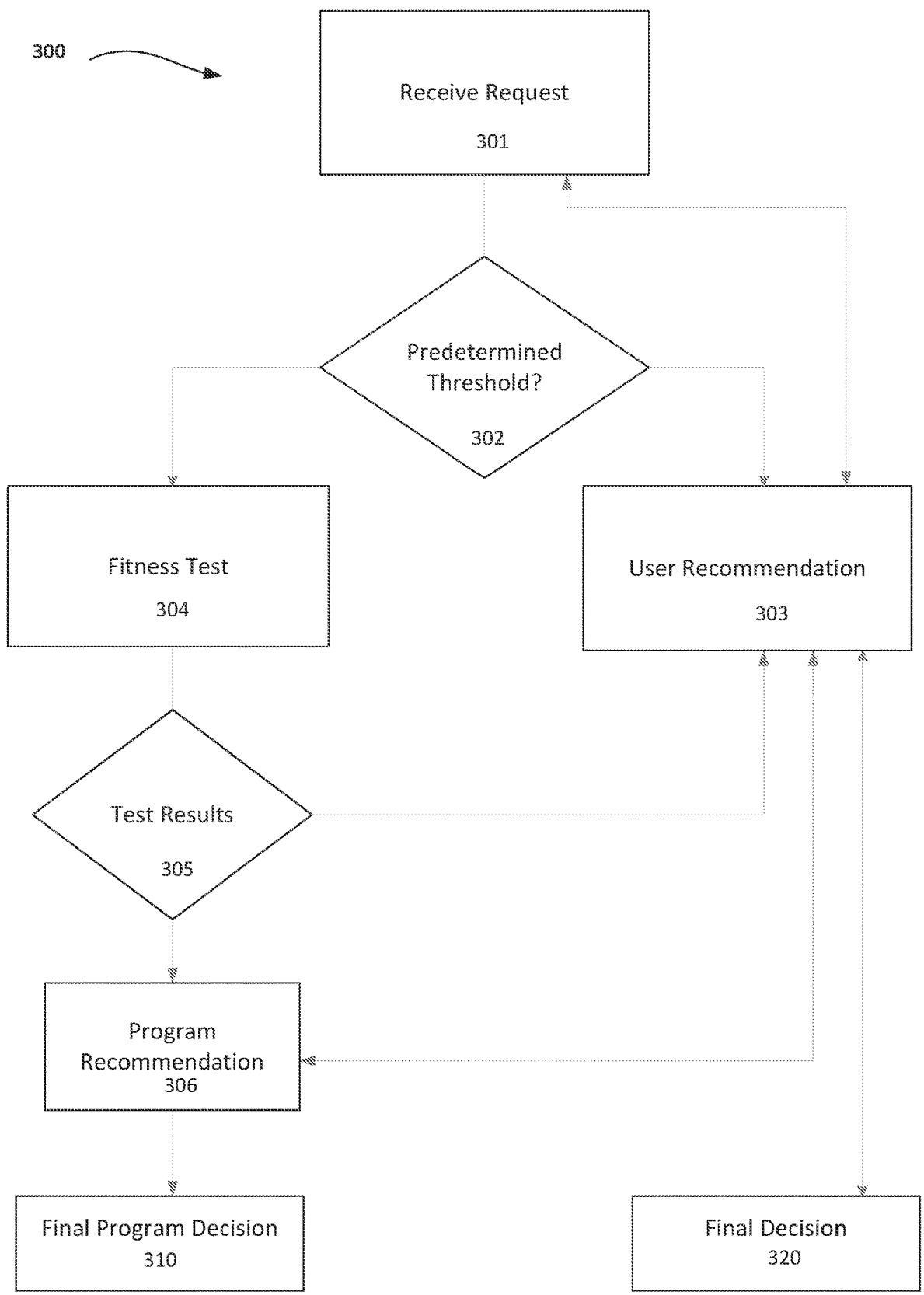
FIG. 3 illustrates an exemplary decision tree employed by a processor according to an aspect of the application.

According to a further embodiment, the application 201 evaluates the transaction based upon one or more decision criteria. A flowchart 300 of the decision criteria tree is illustrated in FIG. 3. In step 301 the application 201 receives the request from a user. The application 201 determines if the request exceeds a predetermined threshold at box 302. That is, the application determines whether the request meets a certain capital expenditure, e.g., more than $500. If the request does not exceed a predetermined threshold, the application proceeds to box 303 for a user recommendation. If requested, the user can provide further input about the request for consideration by the application 201. In an alternative embodiment, the application 201 may approve the request resulting in a final decision 320 to proceed.

Figure 4:
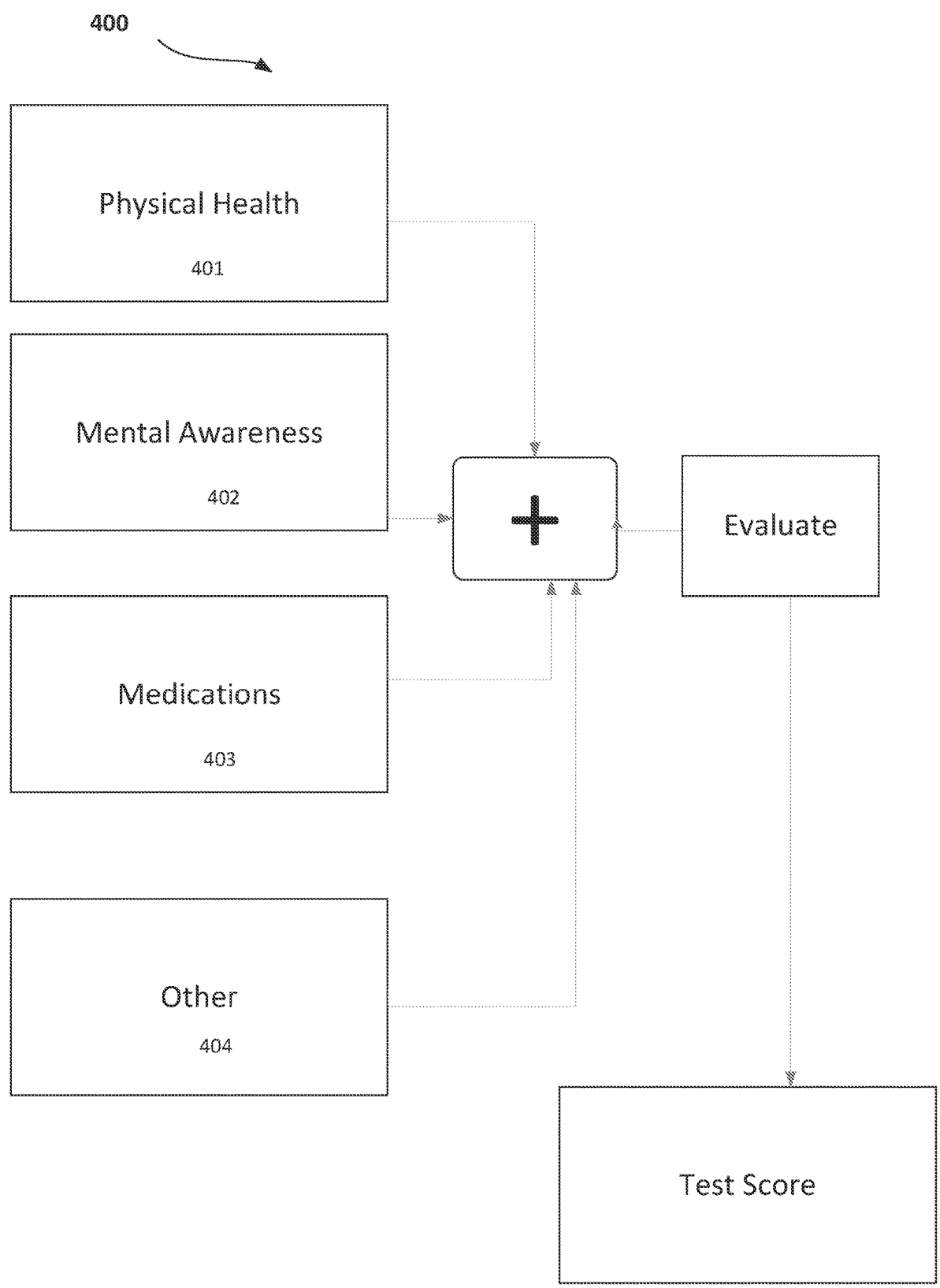
FIG. 4 illustrates factors considered for evaluating mental fitness according to an aspect of the application.

On the other hand, if the request exceeds a predetermined threshold, e.g. greater than $500, the application proceeds to step 304 to perform a fitness test. The fitness test 304 may include one or more factors as shown in FIG. 4. According to FIG. 4, the factors which are considered may include physical health, mental awareness, current medications being taken, and other factors, such as for example, personal details, e.g., birthday, climate, e.g., winter versus summer, time of day, and other social and environmental considerations that are known to affect judgment.

In the fitness test 304, one or more of the above-mentioned factors are evaluated. To determine a test result, the one or more factors may be input into an equation. The application then obtains information of these factors an inputs them to an equation for determining a final result. In an embodiment, the factors may be equally weighted. In an alternative embodiment, certain factors may be weighted heavier than other factors. In another embodiment, the factors may be weighted in accordance with the user's specific mental health condition. That is, certain factors may be weighted more heavily than other factors based upon the specific mental condition of the individual. Further, the weight of the fitness test equation factors may be determined prior to using the application or may alternatively be periodically updated.

Subsequently, upon evaluation of the test results 305, if the score is above a predetermined threshold, e.g., 85, the application may inquire about the user's specific use via box 303. This may be employed in instances where the test results 035 are not definitive of the user's capacity. However, if the reason provided by the use is credible, the application may authorize the request.

In another embodiment, if the score is below a predetermined threshold, the application may proceed to its recommendation in box 306 without having to go through the fitness test 304.

According to another embodiment, the application may be configured to evaluate additional criteria in box 306. For example, the additional criteria may be based upon the importance of the transaction. Accordingly, if the request exceeds a predetermined threshold, and the user also does not meet a predetermined test score, the user may still have an opportunity for his or her request to be accepted. This may be the case, for example, if the user is requesting funds to pay a mortgage. The application 201 may validate the request possibly by checking a block chain regarding past dealings, e.g., mortgage payments to the mortgager. After validating the request, the application 201 may approve the user's request. On the other hand, if the user's request is to buy a lavish car, e.g., Lamborghini, the application may deny the request since a block chain of past dealings would likely not verify a similar transaction.

In yet another embodiment of the application, along with the denial sent to the user, the Program Recommendation 306 may also be configured to send a recommendation to the user on how to get the request approved. In this embodiment, the application 201 may be configured to review the original request and compare its terms, if available, of similar other agreements. The application may have logic capable off understanding the fair market value of the requested commodity.

In an exemplary embodiment, a user may request $30,000 to buy a vehicle that could be bought for $20,000 elsewhere. The application 201 may provide the user with its recommendation based upon checking other agreements on the database server. The application 201 may also review other agreements on the database, or can scan deals on the Internet to make its determination.

In another embodiment, the application 201 may be configured to provide a final decision 310. The final decision 310 may be a denial of the user's request or an approval of the request. The decision is shown on the graphical user interface 200 for the user to see. According to a further embodiment, the processor may be configured to update and store the user request, fitness test results, and predetermined criteria in the memory. Namely, the data received from the user, as well as the test results, may be useful for subsequent requests by the user. This information may also be added to one or more boxes 211, 212 and 213 depicted in FIG. 2.

In yet another embodiment of the application, the approval of the request from the processor may result in a transfer of funds, such as bitcoins, from a separate custodial account to the user's account. Alternatively, the approval may result in direct payment of funds, such as bitcoins, from the custodial account to the merchant. Upon completion of the transaction involving payment of funds to the user by the application, payment to a merchant by the application, or payment to a merchant by the user, an update is made to the block chain.

In a second aspect of the application, a computer-implemented method for facilitating transactions based upon mental health is described. The method includes a step of displaying, on a GUI, an input box for a user to input a desired transaction. The method also includes a step of receiving, via a network, an input from the user with a specific transaction. The method may also include a step of evaluating the transaction based upon one or more decision criteria.

FIG. 5 illustrates a flow chart 500 of an exemplary embodiment of this aspect associated with a method for evaluating user performance prior to proceeding with a transaction. According step 510, a graphical user interface displays an input box for a user to input information associated with the transaction. According to step 520, information is received via the graphical user interface associated with the transaction. According to step 530, the received information associated with the transaction is evaluated based upon one or more decision criteria. According to step 540, an approval is sent to the user after the evaluation.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures.

The invention claimed is:

1. A system, comprising:
at least one processor; and
a memory communicatively coupled to the at least one processor, the memory storing instructions which, when executed, cause the at least one processor to:
generate a graphical user interface that facilitates performing a financial transaction, wherein the graphical user interface comprises:
an input box configured to receive a request for performing the financial transaction, wherein the request is indicative of a financial transaction value;
a previous financial transactions box configured to receive one or more previous financial transactions of a user associated with the financial transaction that are similar to the financial transaction via a distributed ledger, and
display the one or more previous financial transactions in response to receiving a selection of the one or more previous financial transactions box via the graphical user interface; and
a popular financial transactions box configured to receive one or more popular financial transactions that are similar to the financial transaction via the distributed ledger, and
display the one or more popular financial transactions in response to receiving a selection of the one or more popular financial transactions box via the graphical user interface;
receive the request indicative of the financial transaction value via the input box;
determine whether the financial transaction value exceeds a predetermined financial transaction value threshold;
in response to the financial transaction value exceeding the predetermined financial transaction value threshold, determine a score by evaluating one or more factors based on one or more weighted values associated with the one or more factors, wherein the one or more weighted values are predetermined based on whether a mental health disorder is associated with the user;
in response to the score not exceeding a threshold, provide a recommendation for adjusting the request based on the previous financial transactions, the popular financial transactions, or both; and
provide an indication of approval of the financial transaction via the graphical user interface after receiving a response to the recommendation.

2. The system of claim 1, wherein the instructions cause the at least one processor to store the financial transaction on the distributed ledger in response to providing the indication of approval of the financial transaction.

3. The system of claim 1, wherein the recommendation for adjusting the request comprises a recommended financial transaction value for the financial transaction below the financial transaction value.

4. The system of claim 3, wherein the instructions cause the at least one processor to provide the recommendation for adjusting the request by providing a final decision window via the graphical user interface to accept or deny the recommended financial transaction value.

5. The system of claim 1, wherein the one or more factors comprise a time of day associated with receiving the request, an age of the user, a climate where the user is located, or any combination thereof.

6. The system of claim 1, the instructions cause the at least one processor to determine the score based on using an equation to consider the one or more weighted values associated with the one or more factors to calculate the score.

7. The system of claim 1, wherein the instructions cause the at least one processor to:
   determine that the request is associated with a contract that comprises one or more terms in response to receiving the request; and
   display the one or more terms via the graphical user interface.

8. The system of claim 7, wherein the contract comprises a smart contract associated with the financial transaction that is stored on the distributed ledger.

9. A computer-implemented method comprising:
   generating, by at least one processor, a graphical user interface that enables performing a financial transaction, wherein the graphical user interface comprises:
      an input box configured to receive a request for performing the financial transaction, wherein the request is indicative of a financial transaction value;
      a previous financial transactions box configured to
         receive one or more previous financial transactions of a user associated with the financial transaction that are similar to the financial transaction via a distributed ledger, and
         display the one or more previous financial transactions in response to receiving a selection of the one or more previous financial transactions box via the graphical user interface; and
      a popular financial transactions box configured to
         receive one or more popular financial transactions of other users that are similar to the financial transaction via the distributed ledger, and
         display the one or more popular financial transactions in response to receiving a selection of the one or more popular financial transactions box via the graphical user interface;
   receiving the request, by the at least one processor and via the input box of the graphical user interface, indicative of the financial transaction value;
   determining, by the at least one processor, that the financial transaction value exceeds a financial transaction value threshold;
   in response to the financial transaction value exceeding the financial transaction value threshold, determining, by the at least one processor, a score by evaluating one or more factors based on one or more weighted values associated with the one or more factors, wherein the one or more weighted values are predetermined based on whether a mental health disorder is associated with the user; and
   in response to the score not exceeding a threshold, providing, by the at least one processor and via the graphical user interface, an indication of refusal of the financial transaction.

10. The computer-implemented method of claim 9, comprising:
   in response to the score not exceeding the threshold, evaluating, by the at least one processor, one or more additional criteria associated with the financial transaction; and
   providing, by the at least one processor and via the graphical user interface, an indication of approval or the indication of refusal of the financial transaction based on evaluating the one or more additional criteria.

11. The computer-implemented method of claim 10, comprising providing an indication of approval in response to determining, by the at least one processor, that at least one of the one or more previous financial transactions or at least one of the one or more popular financial transactions are previously approved.

12. The computer-implemented method of claim 9, comprising storing, by the at least one processor, the request and the score on the distributed ledger.

13. The computer-implemented method of claim 9, wherein the graphical user interface comprises a denied financial transactions box configured to display one or more previous financial transactions, one or more popular financial transactions, or both, that are previously denied.

14. One or more non-transitory computer-readable storage media comprising instructions which, when executed by at least one processor, cause the at least one processor to:
   generate a graphical user interface that enables performing a financial transaction, wherein the graphical user interface comprises:
      an input box configured to receive a request for performing the financial transaction, wherein the request is indicative of a financial transaction value;
      a previous financial transactions box configured to
         receive one or more previous financial transactions of a user associated with the financial transaction that are similar to the financial transaction via a distributed ledger, and
         display the one or more previous financial transactions in response to receiving a selection of the one or more previous financial transactions box via the graphical user interface; and
      a popular financial transactions box configured to
         receive one or more popular financial transactions of other users that are similar to the financial transaction via the distributed ledger, and
         display the one or more popular financial transactions in response to receiving a selection of the one or more popular financial transactions box via the graphical user interface;
   receive the request indicative of the financial transaction value via the input box;
   determine that the financial transaction value exceeds a financial transaction value threshold;
   in response to the financial transaction value exceeding the financial transaction value threshold, determine a score by evaluating one or more factors based on one or more weighted values associated with the one or more factors, wherein the one or more weighted values are predetermined based on whether a mental health disorder is associated with the user; and
   in response to the score exceeding a threshold, provide an indication of refusal of the financial transaction while providing a recommended value for the financial transaction via the graphical user interface based on the one or more previous financial transactions that are similar to the financial transaction, the one or more popular financial transactions that are similar to the financial transaction, or both.

15. The one or more non-transitory computer-readable storage media of claim 14, wherein the one or more factors comprise a time of day associated with receiving the request, an age of the user, a climate where the user is located, or any combination thereof.

16. The one or more non-transitory computer-readable storage media of claim 14, wherein providing the recommended value for the financial transaction comprises displaying a final decision window via the graphical user interface to whether accept or deny the recommended value for the financial transaction.

17. The one or more non-transitory computer-readable storage media of claim 14, wherein providing an indication of refusal is based on the one or more previous financial transactions, the one or more popular financial transactions, or both.

18. The one or more non-transitory computer-readable storage media of claim 14, the instructions cause the at least one processor to store the request and the score on a distributed ledger.

\* \* \* \* \*